(12) United States Patent
Courteville

(10) Patent No.: US 7,782,468 B2
(45) Date of Patent: Aug. 24, 2010

(54) METHOD AND DEVICE FOR MEASURING HEIGHTS OF PATTERNS

(75) Inventor: Alain Courteville, Congenies (FR)

(73) Assignee: Nanotec Solution, Nimes (FR)

( * ) Notice: Subject to any disclaimer, the term of this patent is extended or adjusted under 35 U.S.C. 154(b) by 220 days.

(21) Appl. No.: 12/090,137

(22) PCT Filed: Oct. 12, 2006

(86) PCT No.: PCT/FR2006/002296
§ 371 (c)(1),
(2), (4) Date: Jul. 7, 2008

(87) PCT Pub. No.: WO2007/042676
PCT Pub. Date: Apr. 19, 2007

(65) Prior Publication Data
US 2009/0303495 A1    Dec. 10, 2009

(30) Foreign Application Priority Data
Oct. 14, 2005    (FR) .................................. 05 10530

(51) Int. Cl.
*G01B 11/02* (2006.01)
*G01B 9/02* (2006.01)
(52) U.S. Cl. .................... 356/511; 356/521; 356/516
(58) Field of Classification Search ................. 356/516, 356/521, 511
See application file for complete search history.

(56) References Cited

U.S. PATENT DOCUMENTS

| | | | | |
|---|---|---|---|---|
| 4,358,201 A | | 11/1982 | Makosch | |
| 4,770,532 A | * | 9/1988 | Ito | 356/625 |
| 5,581,345 A | * | 12/1996 | Oki et al. | 356/511 |
| 6,580,515 B1 | | 6/2003 | Li et al. | |
| 2009/0303495 A1 | * | 12/2009 | Courteville | 356/625 |

FOREIGN PATENT DOCUMENTS

| | | |
|---|---|---|
| EP | 0 708 307 A2 | 4/1996 |
| EP | 1 296 367 A1 | 3/2003 |
| WO | WO 02 15238 A2 | 2/2002 |

OTHER PUBLICATIONS

Ooki H., et al.; XP002028936; Laser Scanning Mode Interference Contrast Microscope and Its Application to Step Height Measurement; Jpn. J. Appl. Phys. vol. 32; Nov. 1993; pp. 4998-5001.

* cited by examiner

*Primary Examiner*—Patrick J Connolly
(74) *Attorney, Agent, or Firm*—Greer, Burns & Crain, Ltd.

(57) ABSTRACT

A method for measuring the heights of patterns of an object, including: a light emission, the light includes a propagation mode of interest for at least one wavelength of interest, an illumination of the surface of the object by the light, a reflection of the light by the surface of the object, a collection of the reflected light, a division of the wavefront of the reflected light into division components, by at least one pattern of the illuminated surface, a filtering of the collected light, including a modal filtering removing all modes other than the propagation mode of interest, for the wavelengths of interest, and from the filtered light, and for the wavelengths of interest, an extraction of information about phase differences between the division components.

17 Claims, 3 Drawing Sheets

METHOD AND DEVICE FOR MEASURING HEIGHTS OF PATTERNS

TECHNICAL FIELD

Figure 1:
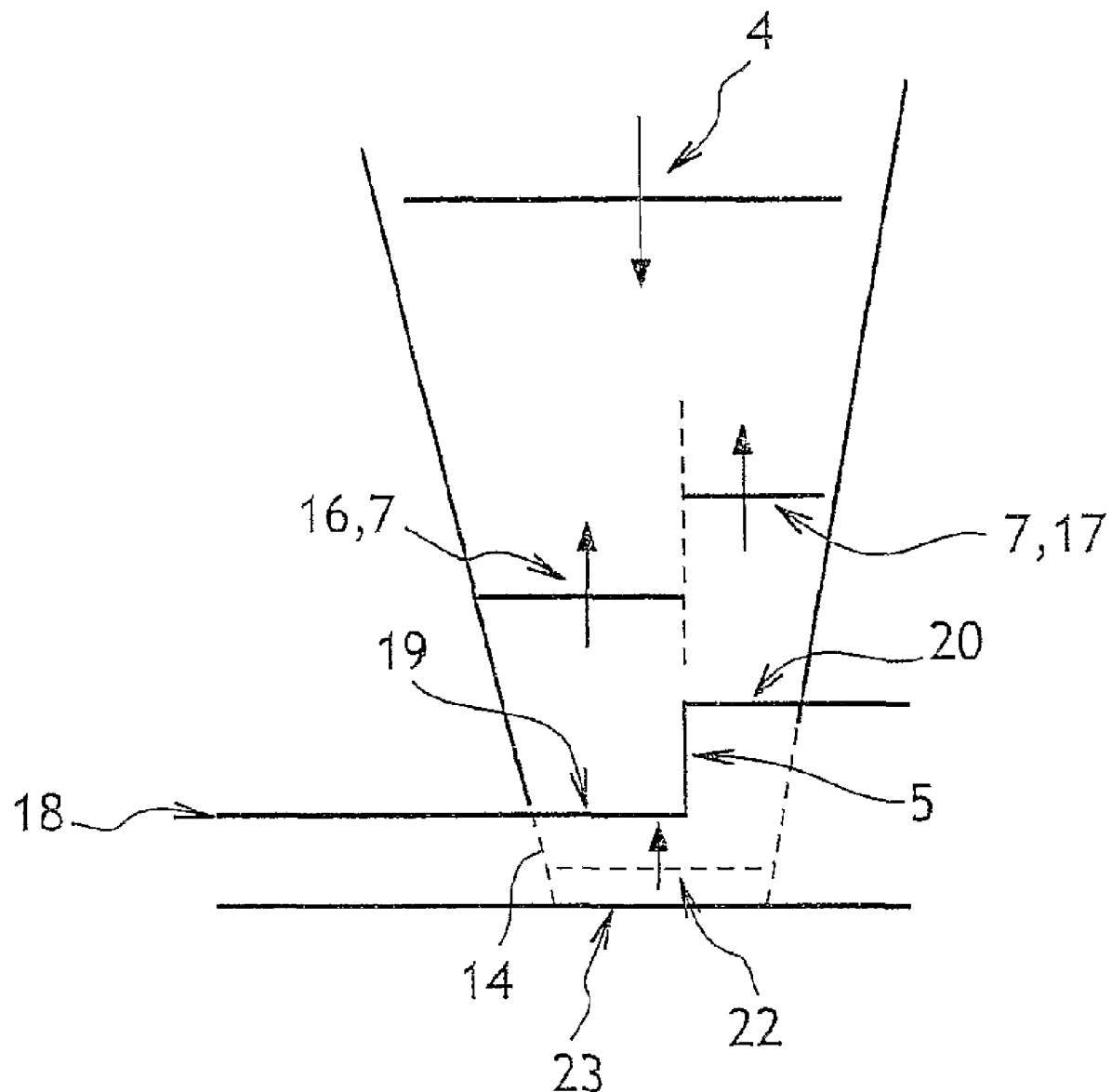

The present invention relates to a method for measuring the heights of patterns of an object. It also relates to a device implementing this method. By measuring the heights of patterns is meant measuring the height or heights of one or more patterns. For example, for a pattern having a shape of steps, one height per step can be measured.

The field of the invention is that of measuring the heights of patterns of an object the surface of which is structured and reflects light. A more precise and in no way limitative example of the field of application, among others, can be that of lithography and the etching of micro-patterns on silicon wafers.

STATE OF THE PRIOR ART

The development of microsystems (or MEMS, for "Micro-Electro-Mechanical Systems") requires the use of etching methods making it possible to carry out the etching of deep patterns, from a few tens to a few hundreds of microns in depth, in particular in wafers of silicon, silicon oxide and III-V compounds such as gallium arsenide. Deep plasma etching is included in these methods.

Plasma etching consists of carrying out a selective etch, using a gas plasma generated in a partial vacuum, of the parts of a wafer which are not protected by a resin or aluminium mask. It is thus possible to obtain, with a high precision, patterns having significant form factors (defined as the ratio of the depth of the pattern to the width of said pattern) and very steep sides. However, a certain number of problems arise for this type of etching, including determining the end of the etch, or in other words determination of the moment when the patterns have reached the required depth. This determination is complex. In fact, the etching time required in order to obtain patterns with the desired form factors depends, among others, on the physical and chemical characteristics of the plasma and the nature of the wafer. Furthermore, this determination is crucial in that the desired depth resolution for this type of etching can be of the order of one micron.

Certain methods for measuring the heights of patterns do exist, but do not give full satisfaction. Among them, there can be mentioned:

measuring methods based on incremental laser interferometry,
measuring methods based on normal incidence spectroscopic ellipsometry, and
measuring methods based on low-coherence interferometry and on a division of amplitude due to partial reflections on successive interfaces.

The measuring methods based on incremental laser interferometry are generally implemented by devices comprising a Michelson-type interferometer, and include measuring the phase variation of an interferometric signal due to the height variation of the point of contact of a measuring beam on the surface of an object. These measuring methods are difficult to apply to deep plasma etching, as strictly speaking, they do not comprise thickness or height measurements, but measurements of relative displacements of the surface of the object with respect to the frame of the measuring device. These measuring methods are therefore sensitive to movements, vibrations, which can be relatively high in a plasma etching method. Thus, the method disclosed in patent U.S. Pat. No. 6,580,515 B1 is based on a measurement of the difference of optical path between two beams that are incident on the surface of an object at two distinct measurement points, wherein one point can be located in an intact area of the object and the other point can be located at the base of an etched pattern. As a result on the one hand, of the distance between the interferometer and the object, which is usually a few hundreds of millimetres, and on the other hand, the diffraction of the incident beams, the size of the measurement points is of the order of a few tens of microns, which does not allow the use of these methods for the measurement of narrow patterns.

The measuring methods based on normal incidence spectroscopic ellipsometry, also known under the name of "Optical Critical Dimension (OCD) metrology", make it possible to determine the structure of periodic patterns of an object from the spectral and polarimetric properties of the light backscattered by the structure, and their use is therefore restricted to periodic patterns. Furthermore, their effectiveness is very dependant on the patterns. Such a measuring method is for example disclosed in patent WO 02/15238 A2.

The measuring methods based on low-coherence interferometry are generally implemented by a device comprising a Michelson interferometer, this time illuminated by a wide-spectrum light source. By using wavelengths at which the object is transparent, it is possible to measure thicknesses of materials directly, by carrying out in the interferometer an optical correlation of the light backscattered by the upper and lower faces of the object, with a reference beam originating from a single source and the optical path of which is varied using a delay line. When the optical paths between the reflection from one of the faces of the wafer and the reference beam are equal, an interference peak is obtained on a detector which thus makes it possible to locate the interface. The location of two interfaces thus makes it possible to deduce the local thickness of a wafer. These methods are therefore based on a division of amplitude due to partial reflections from successive interfaces. The general implementation of this type of method has been widely known for a long time, and an example of this, applied to the problem of chemical etching, can be found in patent EP 1 296 367 A1.

The aim of the invention is to propose a method and a device for measuring the heights of patterns of an object, applicable:

to narrow or wide patterns,
to periodic or non periodic patterns,
in situ, directly and in real time, for example during an etching, and
on objects which do not necessarily comprise several optical interfaces.

DISCLOSURE OF THE INVENTION

This aim is achieved with a method for measuring the heights of patterns of an object, comprising:

a light emission, said light comprising a propagation mode of interest for at least one wavelength of interest, the emitted light thus can be monochromatic or polychromatic, and can comprise, for the wavelengths of interest or other wavelengths, other propagation modes than the propagation mode of interest,
an illumination of the surface of said object by the light,
a reflection of the light, by the surface of the object,
a collection of the reflected light, characterized in that it comprises moreover:
a division of the wavefront of the reflected light into division components, by at least one pattern of the illuminated surface,
a filtering of the collected light, and from the filtered light, and for the wavelengths of interest, an extraction of information about phase differences between the division components; these phase differences are representative of step differences between the division components, and therefore of differences between heights of the illuminated pattern(s).

In the case of an emission of a plurality of wavelengths of interest, these wavelengths can be emitted simultaneously or during a time-based wavelength scan. Furthermore, these wavelengths can be discontinuous, or can form a wavelength continuum over a wavelength interval.

By illumination, is meant for example a focusing or collimation of the emitted light, and the beam of light that is incident at the surface of the object can be a parallel or not parallel light beam.

The filtering can comprise a modal filtering, suppressing for the wavelengths of interest all modes other than the propagation mode of interest.

Preferably, the propagation mode of interest consists of a fundamental transverse mode (or "transverse electric and magnetic (TEM) mode") $TEM_{00}$.

The illumination by the light can be normally incident with respect to the surface of the object.

The method according to the invention can moreover comprise a displacement of the illumination on the surface of the object.

The light emission can comprise:
an emission of a plurality of propagation modes for a plurality of wavelengths, and
a modal filtering, removing all the modes other than the propagation mode of interest for the wavelengths of interest.

The method according to the invention can be implemented during an operation of etching patterns on the object. The method according to the invention can in fact be implemented during an etching, in situ, directly and in real time.

The method according to the invention can moreover comprise a determination of an etching end time, for the control and stopping of an etching operation, from monitoring the etching progress of one or more patterns of the object, or for developing an etching protocol; the determined etching end time can then be used to carry out other etchings under identical experimental conditions without having to measure pattern heights in situ and in real time.

According to yet another aspect of the invention, a device for measuring heights of patterns of an object is proposed, using a method according to the invention, and comprising:
light emission means, said light comprising a propagation mode of interest for at least one wavelength of interest,
means for outward guidance of the light,
means for illuminating, by the light, the surface of said object, said object reflecting the light,
means for collecting the reflected light,
means for return guidance of the collected light, characterized in that it comprises moreover:
means for filtering the collected light, and
means for extracting, from the filtered light, and for the wavelengths of interest, information about phase differences between components of a wavefront division of the reflected light; these phase differences are representative of step differences between the division components, and therefore of differences between of heights of the illuminated pattern(s).

The filtering means can comprise means for the modal filtering of the collected light, suppressing for the wavelengths of interest all the modes other than the propagation mode of interest.

The object can consist, among others, of a wafer of silicon, silicon oxide, a III-V compound such as gallium arsenide, or in any other micro- or macroscopic object the surface of which is structured and reflects the light.

The device according to the invention can moreover comprise means of displacing the illumination on the surface of the object.

The outward and return guidance means can comprise single-mode optical fibres.

The illumination means and the collection means can be combined, and the device according to the invention can moreover comprise a coupler, Y-junction or circulator separating the emitted light and the collected light.

The extraction means can comprise a Michelson interferometer.

The device according to the invention can comprise moreover:
a camera focused on the object,
means of lighting the object with white light, and
means for emitting a laser beam pointing a measurement area, which emits in the visible range.

In an embodiment, the device according to the invention can be coupled to pattern-etching means. The device according to the invention can then also comprise means for determining an etching end time. The etching means can comprise a plasma etching device.

The device according to the invention can also be applied to a measurement of the heights of steps between mirrors of a segmented mirror, such as a segmented telescope mirror for example.

The originality of this method, by comparison with the standard low-coherence interferometry resides in the fact that it is possible to make use of the division and coding of the wavefront by at least one pattern, that is then recoded as a pure optical delay by means of a filtering, and not an amplitude division due to partial reflections from successive interfaces, as it is the case in a standard fashion. An important consequence of this is that the measuring of heights becomes possible for patterns the size of which is less than the width of the incident beam, which is always the case due to the diffraction when optics focusing or collimating the light onto the object are at several hundreds of millimetres from the object. So therefore this is precisely this originality which renders the method particularly useful for the control of etching in a plasma etching device, due to the structure of the machines which prevents any short distance measurement.

Moreover, it should be noted that a measuring device according to the invention also makes it possible to carry out thickness measurements in a standard fashion by amplitude division, which in one single measurement makes it possible to determine the height of a pattern and the thickness of remaining material.

DESCRIPTION OF FIGURES AND EMBODIMENTS

Figure 2:
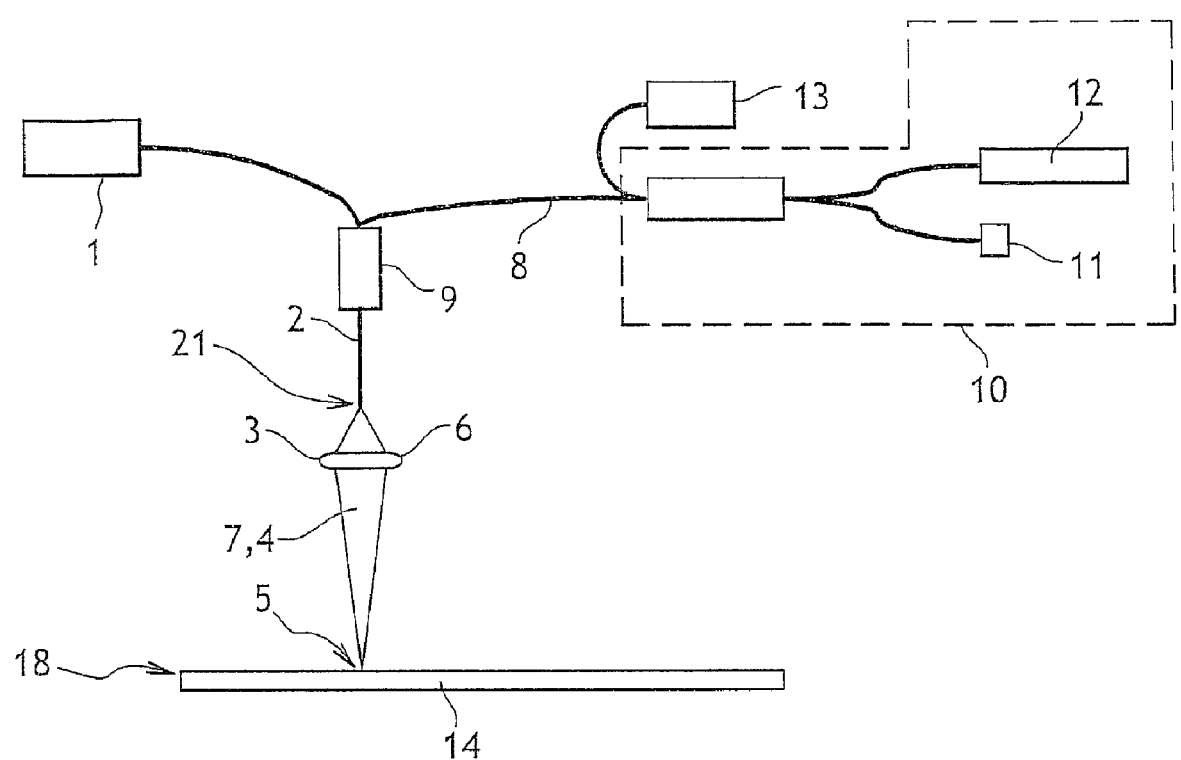
Figure 3:
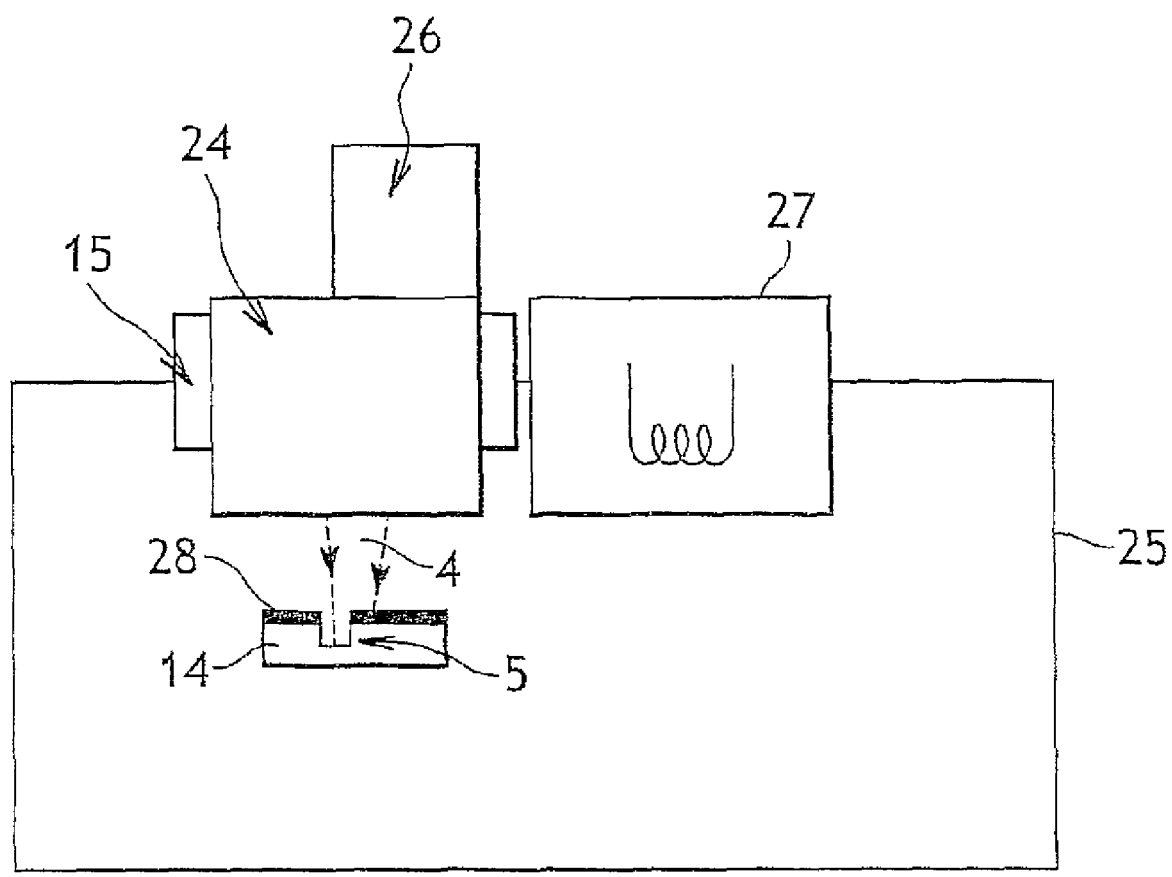

Other advantages and characteristics of the invention will become apparent on examination of the detailed description of embodiments which are in no way limitative, and the following attached drawings:

FIG. 1 illustrates the principle of a method for measuring pattern heights according to the invention, FIG. 2 illustrates a measuring device according to the invention, and FIG. 3 illustrates an application to plasma etching of a measuring device according to the invention.

Firstly, with reference to FIG. 1, the principle of a method according to the invention for measuring pattern heights will be described. The object on which the patterns are etched can for example consist of a silicon wafer. Generally, this object can consist of any object having a structured surface and which reflects light.

Such a method is based on a direct measurement of the heights of at least one pattern by division of a wavefront and modal filtering of an light beam reflected by the pattern. A mono- or polychromatic light beam is emitted. The light comprises a propagation mode of interest for at least one wavelength of interest. This beam is guided then focused or collimated onto a surface of an object 14 carrying at least one etched pattern 5 on its surface. Preferably, the light beam that is incident to the surface of the object comprises a single fundamental transverse mode $TEM_{00}$, for a continuous range of infra-red wavelengths of interest. Also preferably, the wavefront that is incident to the surface of the object is plane and parallel to the surface. The size of the surface focusing "point", limited by diffraction, is typically a few tens of microns.

The method then comprises a reflection of the incident light 4 by the upper surface 18 of the object. If the focusing point covers a pattern 5, the reflection comprises a division of the wavefront of the light as a function of the depth where the reflection is locally produced. Thus the reflected light 7 is constituted by several division components, having plane wavefronts, and which can be considered to be as many waves with phase differences proportional to the differences in distance travelled before reflection. In the simple case illustrated in FIG. 1, where the pattern 5 is a single step, a low area 19 and a high area 20 of the upper surface 18 of the object give rise to two division components 16 and 17 of the reflected light. These two components have a phase difference which increases with the height of the pattern. If the object comprises an interface 23 under the pattern 5, an additional reflection 22 due to the interface can appear.

The reflected light is then collected. The method thus comprises a modal filtering and return guidance of the collected light. The modal filtering removes from the collected light, for the wavelengths of interest, all the modes other than the propagation mode of interest. The method thus comprises an extraction from the filtered light of information about phase differences between the different division components, at the wavelengths of interest.

The object can consist, among others, of a wafer of silicon, silicon oxide or a III-V compound such as gallium arsenide, said wafer comprising on its surface micropatterns etched by lithography.

The object can also consist of a segmented mirror, of a telescope for example, constituted by a plurality of mirrors arranged side-by-side. In order for the surface of the segmented mirror to be perfect, the mirrors must have height differences which are approximately nil where they join. A slight difference of height at the joint between two mirrors of the segmented mirror is evidenced by a small step, the height of which can be measured by the method according to the invention. Thus, the field of the invention is in a general fashion, the measurement of the heights of patterns of an object the surface of which is structured and reflects light.

With reference to FIG. 2, an example of a measuring device according to the invention will now be described. The measuring device comprises means for emitting light 1, which emits a polychromatic light. Preferably, the emission means comprise a superluminescent diode emitting, in the infra-red, a continuum of wavelengths in the thirties of nanometres in width. The source is coupled to means 2 for outward guidance of the light of the optical fibre or waveguide type or equivalent, allowing only the propagation of the propagation mode of interest for the wavelengths of interest emitted by the source. Illumination means 3 such as collimation optics make it possible to focus the incident light beam 4 onto a pattern 5 of which it is sought to measure the height or heights, said pattern being etched on the surface of an object 14. The collimation optics are adjusted such that the plane of the end 21 of the outward guidance means 2 and the surface 18 of the object are conjugated, or in other words images of each other by the collimation optics. In this case, the wavefront that is incident to the surface of the object is plane.

As previously described, the light 7 reflected by the surface is constituted by different components, having plane wavefronts and with phase differences. These reflected waves are coupled by collection means 6 (such as collection optics) in return guidance means 8. The return guidance means consist of a waveguide of an equivalent type to the outward guidance means. Each component will generate, by electromagnetic coupling in the waveguide, a wave in the propagation mode of interest (the only one possible) which will retain only the mean phase of the collected wave. Thus the return guidance means act as modal filtering means and make it possible to reject the high frequencies of the collected wave, retaining only the phase information of interest.

The collected and filtered light is then directed towards means for extracting, for the wavelengths of interest and the propagation mode of interest, the information concerning the phase differences between the division components. The extraction means include an optical correlator 10, which is typically, but non-limitatively, a Michelson interferometer with a fixed-length reflector arm 11, and a variable-length arm 12 (also called delay line) based on a mobile mirror. The resulting interference signal is detected by a detector 13. When an optical delay is reproduced between the two arms of the Michelson interferometer which is equivalent to that existing between the division components originating from partial reflections, a maximum amplitude is obtained on the detector within the interferogram envelope, or interference peak, for a delay line position corresponding to the height difference of the surfaces which generated the partial reflections. If the focus point covers a step pattern such as illustrated in FIG. 1, a peak is detected on the interference signal, for a position of the delay line corresponding to the height of the step. If the pattern covered consists of two steps one after the other, three peaks are detected on the interference signal, for delay line positions corresponding to the height of one of the two steps or the whole step. In other words, three division components with phase differences are detected.

According to a preferred embodiment, all of the outward and return guidance system for the light is provided in monomode optical fibres, which at the same time act as almost perfect modal filters, allowing only the propagation of the fundamental transverse mode $TEM_{00}$.

Also according to a preferred embodiment, the incident beam reaches the object normally incident and the illumination and collection means can be merged, in which case the incident and reflected beams are separated by a coupler, a Y-junction or circulator 9.

A measuring device according to the invention can be mounted directly onto an etching device for "in situ" measurement during an etching operation. FIG. 3 illustrates an application of a measuring device according to the invention to plasma etching. The measuring device comprises firstly a part 24, comprising a part identical to the device illustrated in FIG. 2 and comprising moreover:

a camera with associated lighting means making it possible to image a measurement area in white light, and means for emitting a visible pointing laser beam, in the case where the measurement by interferometry uses an non-visible wavelength of interest, for example infra-red; this visible laser beam makes it possible to pinpoint and display the exact place of measurement with the camera.

The measuring device illustrated in FIG. 3 moreover comprises;

means for displacing 15 the part 24 comprising the illumination means, relative to the object 14; these displacement means can be motorized or not, along two or three axes, and make it possible to move the measurement point of the incident light 4 with precision over the surface of the object, and measurement analysis means 26; these analysis means can comprise software measurement analysis means, and means of displaying measured or analyzed data.

The measuring device is coupled to etching means such as a plasma etching device comprising:

a sealed chamber 25 containing the object and a gas capable of being ionized in the form of a plasma, and means for creating a plasma 27, generally comprising an electrical supply.

A resin or aluminium mask 28 deposited onto the object allows a selective etch of the unprotected parts of the surface of the object, using the gas plasma generated in the chamber.

The analysis means 26 make it possible, by time-based monitoring of the pattern height measurements and optionally of measurements of the thickness of the remaining material, to determine an etching end time according to several possible criteria:

real-time measurement of the etching depth of a pattern 5 and stopping the etching with a depth instruction.

measurement of the initial thickness to be etched and of the remaining etching thickness and stopping etching on a remaining thickness instruction.

The thickness measurement can relate to one layer in the case where the object is a set of multilayer wafers.

The applications of such a device are, non-limitatively:

the control and stopping of an etching operation, from monitoring the progress of one or more patterns of the object, the development of an etching protocol; the etching end time determined can then be used to carry out further etchings under identical experimental conditions without having to measure pattern heights in situ and in real time.

Of course, the invention is not limited to the examples which have just been described, and numerous adjustments can be made to these examples without exceeding the scope of the invention. A measuring device according to the invention can be applied to any structure which reflects light, and to types of etching other than plasma etching.

The invention claimed is:

1. A method for measuring the heights of patterns of an object, comprising:

a light emission, said light comprising a propagation mode of interest for at least one wavelength of interest, an illumination of the surface of said object by the light, a reflection of the light by the surface of the object, a collection of the reflected light, a division of the wavefront of the reflected light into division components, by at least one pattern of the illuminated surface, a filtering of the collected light, comprising a modal filtering removing all modes other than the propagation mode of interest, for the wavelengths of interest, and from the filtered light, and for the wavelengths of interest, an extraction of information about phase differences between the division components.

2. The measurement method according to claim 1, wherein the propagation mode of interest consists of a fundamental transverse mode $TEM_{00}$.

3. The measurement method according to claim 1, wherein said illumination by the light is normally incident with respect to the surface of the object.

4. The measurement method according to claim 1, further comprising a displacement of the illumination over the surface of the object.

5. The measurement method according to claim 1, wherein the light emission comprises:

an emission of a plurality of propagation modes for a plurality of wavelengths, and a modal filtering removing all modes other than the propagation mode of interest, for the wavelengths of interest.

6. The measurement method according to claim 1, in which said method is carried out during an operation of etching patterns on the object.

7. The measurement method according to claim 6, further comprising a determination of an etching end time.

8. A device for measuring the heights of patterns of an object, using the method according to claim 1, and comprising:

light emission means, said light comprising a propagation mode of interest for at least one wavelength of interest, means for outward guidance of the light, means of illumination, by the light, of the surface of said object reflecting the light, means for collecting the reflected light, means for return guidance of the collected light, means for filtering the collected light, comprising modal filtering means of the collected light, removing all modes other than the propagation mode of interest, for the wavelengths of interest, and means for extracting from the filtered light, and for the wavelengths of interest, information about phase differences between components of a wavefront division of the reflected light.

9. The measuring device according to claim 8, further comprising means for displacing the illumination over the surface of the object.

10. The measuring device according to claim 8, wherein said outward and return guidance means comprise monomode optical fibres.

11. The measuring device according claim 8, wherein said illumination means and the collection means are merged, and in further comprising a coupler, Y-junction or circulator separating the emitted light and the collected light.

12. The measuring device according claim 8, wherein said extraction means include a Michelson interferometer.

13. The measuring device according to claim 8, comprising:

a camera focused on the object, means of lighting the object with white light, and means for emitting a laser beam pointing a measurement area, emitting in the visible range.

14. The measuring device according to claim 8, in which it is coupled to means for etching patterns.

15. The measuring device according to claim 14, further comprising means for determining an etching end time.

16. The measuring device according to claim 14, wherein said etching means comprises a plasma etching device.

17. The device according to claim 8, in which it is applied to a measurement of the heights of steps between mirrors of a segmented mirror.

* * * * *